United States Patent [19]
Letica

[11] Patent Number: 4,520,991
[45] Date of Patent: Jun. 4, 1985

[54] APPARATUS FOR MAINTAINING UNIFORM WALL THICKNESS IN HOLLOW MOLDED PLASTIC ARTICLES

[76] Inventor: Ilija Letica, 1700 W. Hamlin Rd., Rochester, Mich. 48063

[21] Appl. No.: 587,588

[22] Filed: Mar. 8, 1984

[51] Int. Cl.³ .................. B29C 1/00; B29F 1/022
[52] U.S. Cl. .................. 249/122; 249/135; 425/542; 425/577
[58] Field of Search .............. 425/542, 577, 412; 249/117, 122, 135

[56] References Cited

U.S. PATENT DOCUMENTS 3,843,088 10/1974 McLoughlin et al. ............ 425/577
4,165,959 8/1979 Dechavanne .................. 425/542
4,467,998 8/1984 Sorensen ..................... 425/577

Primary Examiner—Willard E. Hoag
Attorney, Agent, or Firm—Krass & Young

[57] ABSTRACT

Apparatus for maintaining a diametric uniformity of wall thickness in a hollow molded plastic article by maintaining axial mold alignment over the period of use thereof. Guide blocks are mounted in circumferentially spaced relationship on one of the telescopic mold elements and pockets are provided with wear plates in the opposite element to receive the guide blocks axially therein and to provide a centering maintenance function which overrides the alignment function of other portions of the mold; e.g., tapered telescopic striking surfaces which are internal of the guide and wear block arrangements.

4 Claims, 3 Drawing Figures

APPARATUS FOR MAINTAINING UNIFORM WALL THICKNESS IN HOLLOW MOLDED PLASTIC ARTICLES

INTRODUCTION

This invention relates to injection molding apparatus and particularly to an apparatus which augments the normal strike surfaces of telescopic male and female elements to maintain a uniform wall thickness in hollow molded plastic articles which is injection molded through the use of said apparatus.

BACKGROUND OF THE INVENTON

Hollow articles such as industrial shipping containers for foods, paints, construction material and so forth are often injection molded in large presses having axially aligned sections or portions which are adapt for axial movement relative to one another and which open and close cyclically during the molding operations. The mold tooling which is mechanically carried by the press typically includes a male mold element having a core portion which defines the interior configuration of the article and a female mold element having a cavity which defines the exterior configuration of the molded article. The male and female mold elements are telescopically interfitting along the forementioned axis of press travel.

The male and female mold elements are typically machined or configured to provide cambered or tapering striking surfaces which are outboard of the surfaces forming the mold cavity and which are brought into mutual contact as the mold elements are closed upon one another. The proper alignment and fit of these mold elements and particularly the striking surfaces is of utmost importance in the success of the molding operation in that such fit determines the quantity of flash or overflow from the mold cavity and also the uniformity of the wall thickness of the article about the longitudinal axis.

Excess flash is, of course, to be avoided as it represents wasteful usage of plastic material and requires trimming. However it is not nearly so important in the quality of the molded article as is the maintenance of a uniform wall thickness around the longitudinal axis of the article. If the mold elements, as a result of usage, warpage, thermal expansion or improper installation or maintenance, shift laterally from one another, the result is a progressive wearing of the striking surfaces and the ultimate seating of the two mold elements within one another in an axially misaligned condition such that the radial thickness of the mold cavity is greater on one side than the other. When filled, this results in an article in which the wall thickness on one side exceeds nominal or ideal thickness and the wall thickness on the diametrically opposite side is less than nominal or ideal thickness. The reduced wall thickness clearly reduces the structural strength of the container and may lead to rejection of the container during the inspection phase or a failure of the container in the field; both eventualities are undesirable.

BRIEF SUMMARY OF THE INVENTION

The subject invention comprises an apparatus for maintaining uniform wall thickness in hollow molded plastic articles such as open ended shipping containers which are manufactured in a male/female mold element combination having striking surfaces which provide nominal alignment. In general the invention comprises the addition of principal alignment apparatus which ensures the proper mating relationship between such striking surfaces said apparatus comprising a plurality of guide blocks mounted on one of the elements, preferably the female or cavity element, and a plurality of spaced apart wear plate sets seated in pockets or recesses in the other of said elements, the spacing and axial alignment of said guide blocks and wear plates relative to one another being such as to ensure absolute axial alignment of the mold elements relative to one another and the maintenance of a uniform wall thickness for the molded plastic article when measured about the longitudinal axis thereof.

DETAILED DESCRIPTION OF THE SPECIFIC EMBODIMENT

Figure 1:
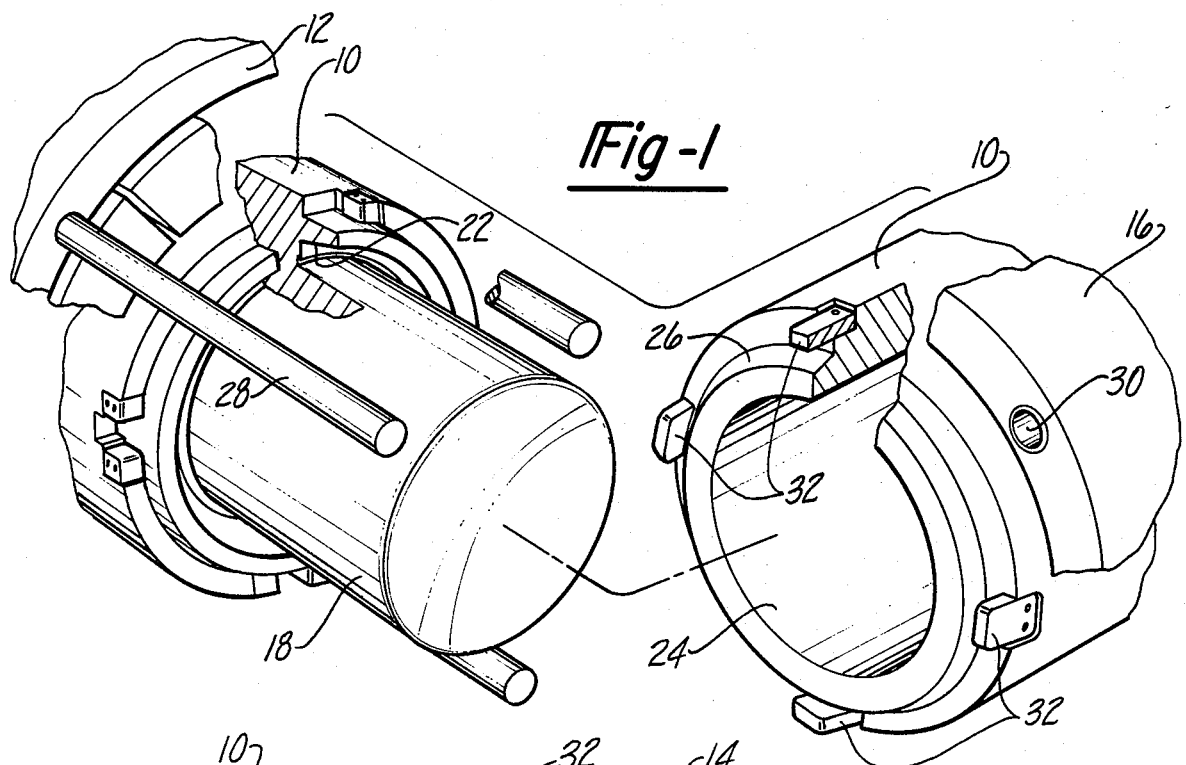
FIG. 1 is a perspective view of a mold apparatus embodying the invention and useful for the manufacture of open ended, cylindrical plastic containers.

Referring the the drawing, a mold apparatus embodying the invention is shown to comprise a male element 10 mounted in a press body 12 for axial movement therewith, and a female mold element 14 mounted in the stationary press section 16, the elements 10 and 14 having a common longitudinal axis of symmetry and relative motion as shown.

Male mold element 10 exhibits a large cylindrical or drum-like core 18 which typically tapers somewhat from left to right, the cylindrical surface 20 of which defines the interior configuration of a molded plastic article to be fabricated therefrom. Male mold element 10 further exhibits a tapering striking surface 22 which lies radially outboard of the article-configuring surface 20 for purposes to be described.

Female mold element 14 exhibits a cavity or interior cylindrical surface 24 the function of which is to define the configuration of the exterior of the molded plastic article. Accordingly, surfaces 20 and 24 are spaced apart in the normal mold-closedrelationship to provide a mold cavity of uniform wall thickness about the axis of symmetry.

Figure 2:
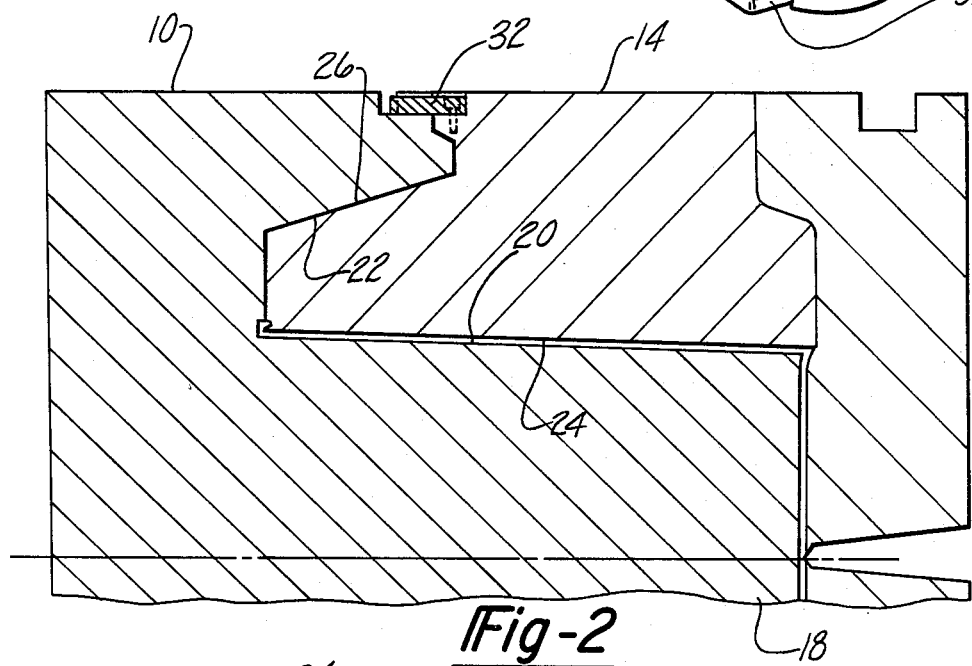
FIG. 2 is a sectional view of a portion of the mold apparatus of FIG. 1 in the closed condition; and, FIG. 3 is a plan view of a guide block and wear plate combination as assembled into the apparatus of FIGS. 1 and 2.

Female mold element 14 also exhibits a telescopic or tapering striking surface 26 which is adapt to mate with the striking surface 22 of the male mold element 10 when the press is closed as shown in FIG. 2.

The mold apparatus is provided with alignment pins or rods 28 mounted on the movable portion 12 and cavities or sockets 30 on the stationary portion 16. Preferably the pins or rods 28 and the sockets 30 are arranged such that the mold apparatus comprising principal elements 10 and 14 will only go together; i.e., into the configuration shown in FIG. 2, if the mold components are properly installed and properly aligned. In other words, the circumferential spacing between the pins or rods 28 is uneven such that any circumferential positioning error in the initial setup of the mold elements prevents the mold from closing and therefore is readily detected.

The striking surfaces 22 and 26, together with the alignment pins 28 and the sockets 30, telescope together to provide axial alignment of the mold elements 10 and 14 and, when the mold is new, are typically machined and configured so as to produce a mold cavity 20,24 which is of uniform wall thickness when measured about the axis of symmetry. However, even slight misalignments which occur either on initial setup or afterward ultimately lead to imperfect contact between the surfaces 22 and 26. As the mold is opened and closed over hundreds or even thousands of mold cycles, misalignment tends to redefine the seating relationship of the striking surfaces 22, 26 and actually permits one of the mold elements to acquire a rest position which is shifted laterally relative to the other element; i.e., the two axes of symmetry are no longer absolutely coextensive. When this happens, the wall thickness on one side of the mold cavity becomes larger and the wall thickness on the diametrically opposite side becomes correspondingly thinner or smaller.

To prevent this from happening, female mold element 14 is provided with four evenly circumferentially spaced and axially extending guide blocks 32. The guide blocks are mounted in recesses or slots 34 which are formed in the outer cylindrical surface of the element 14; i.e., outboard of the striking surface 26. The guide blocks 32 are machined to precise tolerances, the most important of which is the width taken between the exterior circumferentially opposite surfaces $S_1$ and $S_2$.

In addition, the male element 10 has formed therein a plurality of pockets 36 of generally rectangular configuration and having opposed interior recessed side surfaces 38 and 40. Wear plates 42 and 44 of hardened precision steel and of generally rectangular configuration are precisely seated into the recessed portions of the pockets 36 to precisely receive the guide blocks 32 therebetween. Threaded fasteners such as machine screws 50 are preferably used to hold the guide blocks and the wear plates in position.

Figure 3:
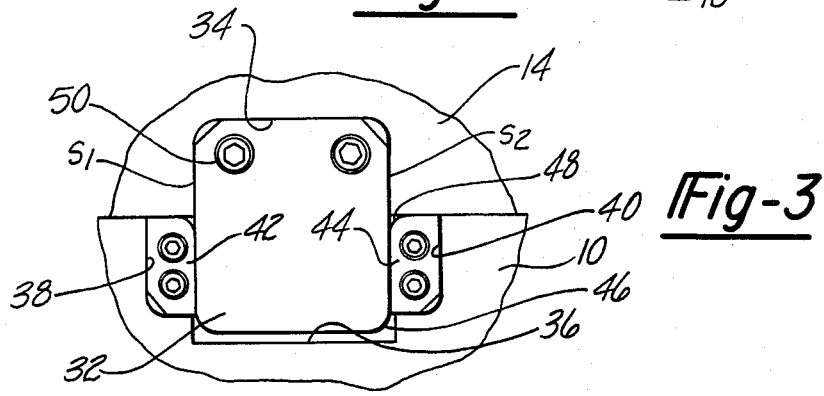

As best shown in FIG. 3, the side recesses of the pockets 36 are shallower than the actual dimensions of the wear plates such that the interior opening dimension is defined by the mating surfaces of the wear plates and not by the dimensions of the pocket or the recesses themselves. The leading edges 46 of the guide blocks are radiused as are the receiving leading edges 48 of the wear plates to relieve stress and avoid breakage to slight misalignment.

Since there are four circumferentially uniformly spaced combinations of guide blocks and wear plates in the mold apparatus, the alignment of the mold elements 10 and 14 about all axes transverse to the longitudinal axis is ensured. This alignment is dictated by the hardened steel surfaces of the guide blocks and wear plates and their seating relationship with one another and is no longer dependent upon the relatively softer, less wear-resistant surfaces 22 and 26. Accordingly, the invention has been found to dramatically increase the life of the mold elements 10 and 14 by eliminating the initial misalignments which lead to friction and wear on the surfaces 22 and 26 and also to ensure over the usable lifetime of the mold the continuous production of articles having a uniform wall thickness when measured in a give plane about the longitudinal axis of symmetry thereof. Obviously the invention is not limited to the manufacture of articles having uniform wall thickness overall as in many cases it may be desirable, for example, to have a greater wall thickness in the bottom of the container than in the side walls or to have a somewhat thicker wall toward the bottom of the container relative to the top. None of these variations is foreclosed by the invention; the ultimate goal of the invention is to maintain whatever original wall thickness specifications are established and to prevent a radial shifting of the mold components which would lead to a reduction in wall thickness specification at one point on the container and a corresponding in wall thickness at a diametrically opposite location in the same perpendicular plane through the axis of symmetry. The guide blocks 32 and wear plates 42, 44 are preferably made of H13 steel hardened to Rockwell C scale 45 to 50.

I claim:

1. Apparatus for maintaining a diametrically uniform wall thickness in a hollow molded plastic article such as an open-ended container comprising:

a male mold element having a first exterior portion defining the interior configuration of the article and a second exterior portion defining a striking surface;

a female mold element having a first interior portion defining the exterior configuration of the article and a second exterior portion defining a second striking surface;

said male and female elements being telescopically interfitting with one another along a common axis with said exterior and first interior portions in spaced apart relation to define a mold cavity for said article and with the first and second striking surfaces in mutual engagement;

a plurality of axially extending guide blocks mounted on one of said mold elements in circumferentially spaced relation adjacent the striking surface thereof;

a plurality of pockets formed in the other of said mold elements adjacent the striking surface thereof and in axially alignment with said guide blocks, each of said pockets having a pair of opposing, interior side surfaces; and first and second reversely similar wear plates mounted within each of said pockets adjacent the opposing side surfaces thereof to define precise openings of a circumferential width closely conforming to the circumferential width of the guide blocks;

thereby to permit telescopic interfitting of said male and female mold elements in an axial alignment which produces a uniform radial thickness of said mold cavity about said axis.

2. Apparatus as defined in claim 1 wherein each of said interior side surfaces includes a recessed portion, said wear plates being mounted into said recesses, the circumferential spacing between the wear plates being less than the circumferential spacing between said interior opposing side surfaces whereby the circumferential width of said openings is defined by said wear plates.

3. Apparatus as defined in claim 1 wherein the guide blocks are essentially rectangular in configuration and have radiused leading edges, the wear blocks also having correspondingly radiused leading edges.

4. Apparatus as defined in claim 1 wherein the guide blocks are mounted on said female mold portion and the wear plates are mounted on the male mold element.

* * * * *